United States Patent
Dieckmann et al.

(10) Patent No.: US 6,660,050 B1
(45) Date of Patent: Dec. 9, 2003

(54) METHOD FOR CONTROLLING DEPOSITS IN THE FUEL REFORMER OF A FUEL CELL SYSTEM

(75) Inventors: Gunther H. Dieckmann, Walnut Creek, CA (US); James D. Kramer, Richmond, CA (US); Richard E. Cherpeck, Cotati, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/155,153

(22) Filed: May 23, 2002

(51) Int. Cl.[7] .................................................. C10L 1/22
(52) U.S. Cl. ........................... 44/412; 44/413; 44/415; 44/424; 44/426; 44/432; 44/331; 208/14
(58) Field of Search ...................... 44/331, 412, 413, 44/415, 424, 426, 432; 208/14

(56) References Cited

U.S. PATENT DOCUMENTS

| | | |
|---|---|---|
| 2,622,018 A | 12/1952 | White et al. |
| 2,782,240 A | 2/1957 | Hefner et al. |
| 2,841,479 A | 7/1958 | Hefner et al. |
| 3,438,757 A | 4/1969 | Honnen et al. |
| 3,440,029 A | 4/1969 | Little et al. |
| 3,565,804 A | 2/1971 | Honnen et al. |
| 3,574,576 A | 4/1971 | Honnen et al. |
| 3,756,793 A | 9/1973 | Robinson |
| 3,848,056 A | 11/1974 | Fonseca |
| 3,849,083 A | 11/1974 | Dubeck |
| 3,960,515 A | 6/1976 | Honnen |
| 4,087,259 A | 5/1978 | Fujitani et al. |
| 4,160,648 A | 7/1979 | Lewis et al. |
| 4,191,537 A | 3/1980 | Lewis et al. |
| 4,197,409 A | 4/1980 | Lilburn |
| 4,231,759 A | 11/1980 | Udelhofen et al. |
| 4,233,168 A | 11/1980 | Lewis et al. |
| 4,236,020 A | 11/1980 | Lewis et al. |
| 4,243,798 A | 1/1981 | Franklin et al. |
| 4,270,930 A | 6/1981 | Campbell et al. |
| 4,288,612 A | 9/1981 | Lewis et al. |
| 4,292,046 A | 9/1981 | Piotrowski |
| 4,409,000 A | 10/1983 | LeSuer |
| 4,518,782 A | 5/1985 | Sung et al. |

(List continued on next page.)

FOREIGN PATENT DOCUMENTS

| | | |
|---|---|---|
| CA | 2 359 723 A1 | 8/2000 |
| EP | 1 486 144 | 9/1977 |
| EP | 0 149 486 A2 | 7/1985 |
| EP | 0 356 726 B1 | 3/1990 |
| EP | 0 382 159 A1 | 8/1990 |
| WO | WO 90/10051 A1 | 9/1990 |
| WO | WO 99/19249 A1 | 4/1999 |
| WO | WO 00/72954 A1 | 12/2000 |

Primary Examiner—Cephia D. Toomer
(74) Attorney, Agent, or Firm—James W. Ambrosius

(57) ABSTRACT

A method for controlling the deposits in the fuel vaporizer of a fuel reformer used to prepare a liquid hydrocarbon for use as a fuel in a fuel cell which comprises introducing into the fuel vaporizer a liquid hydrocarbon containing an effective deposit controlling amount of a nitrogen-containing detergent additive and a fuel composition suitable for use in a fuel cell which comprises a liquid hydrocarbon having a boiling range at atmospheric pressure falling between about 77 degrees F. (25 degrees C.) and about 437 degrees F. (225 degrees C.), a total sulfur content of less than 3 ppm, and containing an effective deposit controlling amount of a nitrogen-containing detergent additive.

62 Claims, 1 Drawing Sheet

U.S. PATENT DOCUMENTS

| | | | |
|---|---|---|---|
| 4,609,377 A | 9/1986 | Sung et al. | |
| 4,729,769 A | 3/1988 | Schlicht et al. | |
| 4,810,263 A | 3/1989 | Zimmerman et al. | |
| 4,832,702 A | 5/1989 | Kummer et al. | |
| 4,836,829 A | 6/1989 | Zimmerman et al. | |
| 4,881,945 A | 11/1989 | Buckley, III | |
| 5,004,478 A | 4/1991 | Vogel et al. | |
| 5,112,364 A | 5/1992 | Rath et al. | |
| 5,139,534 A | 8/1992 | Tomassen et al. | |
| 5,393,309 A | 2/1995 | Cherpeck | |
| 5,405,418 A | 4/1995 | Ansarie et al. | |
| 5,588,973 A | 12/1996 | Blackborow et al. | |
| 5,618,320 A | 4/1997 | Cherpeck | |
| 5,620,486 A | 4/1997 | Cherpeck | |
| 5,669,939 A | 9/1997 | Cherpeck | |
| 5,697,988 A | 12/1997 | Malfer et al. | |
| 5,749,929 A | 5/1998 | Cherpeck et al. | |
| 5,800,798 A * | 9/1998 | Ino et al. | 423/654 |
| 5,833,722 A * | 11/1998 | Davies et al. | 44/418 |
| 5,851,242 A | 12/1998 | Cherpeck et al. | |
| 5,916,825 A | 6/1999 | Cherpeck | |
| 5,954,843 A | 9/1999 | Cherpeck | |
| 5,976,201 A * | 11/1999 | Barry et al. | 44/413 |
| 5,993,497 A | 11/1999 | Cherpeck et al. | |
| H1849 H * | 5/2000 | Fourie et al. | 190/19 |
| 6,086,645 A * | 7/2000 | Quigley et al. | 44/418 |
| 6,114,542 A | 9/2000 | Cherpeck | |
| 6,117,197 A | 9/2000 | Houser | |
| 6,129,835 A * | 10/2000 | Lesieur et al. | 208/208 R |
| 6,156,084 A | 12/2000 | Bonville, Jr. et al. | |
| 6,203,584 B1 | 3/2001 | Fuentes-Afflick et al. | |
| 6,217,624 B1 | 4/2001 | Morris et al. | |
| 6,348,278 B1 * | 2/2002 | LaPierre et al. | 429/17 |
| 6,454,935 B1 * | 9/2002 | Lesieur et al. | 208/244 |
| 6,475,376 B2 * | 11/2002 | Jossens et al. | 208/213 |
| 2003/0031616 A1 * | 2/2003 | Szydlowski et al. | 423/416 |
| 2003/0127355 A1 * | 7/2003 | Saitou et al. | 204/14 |

\* cited by examiner

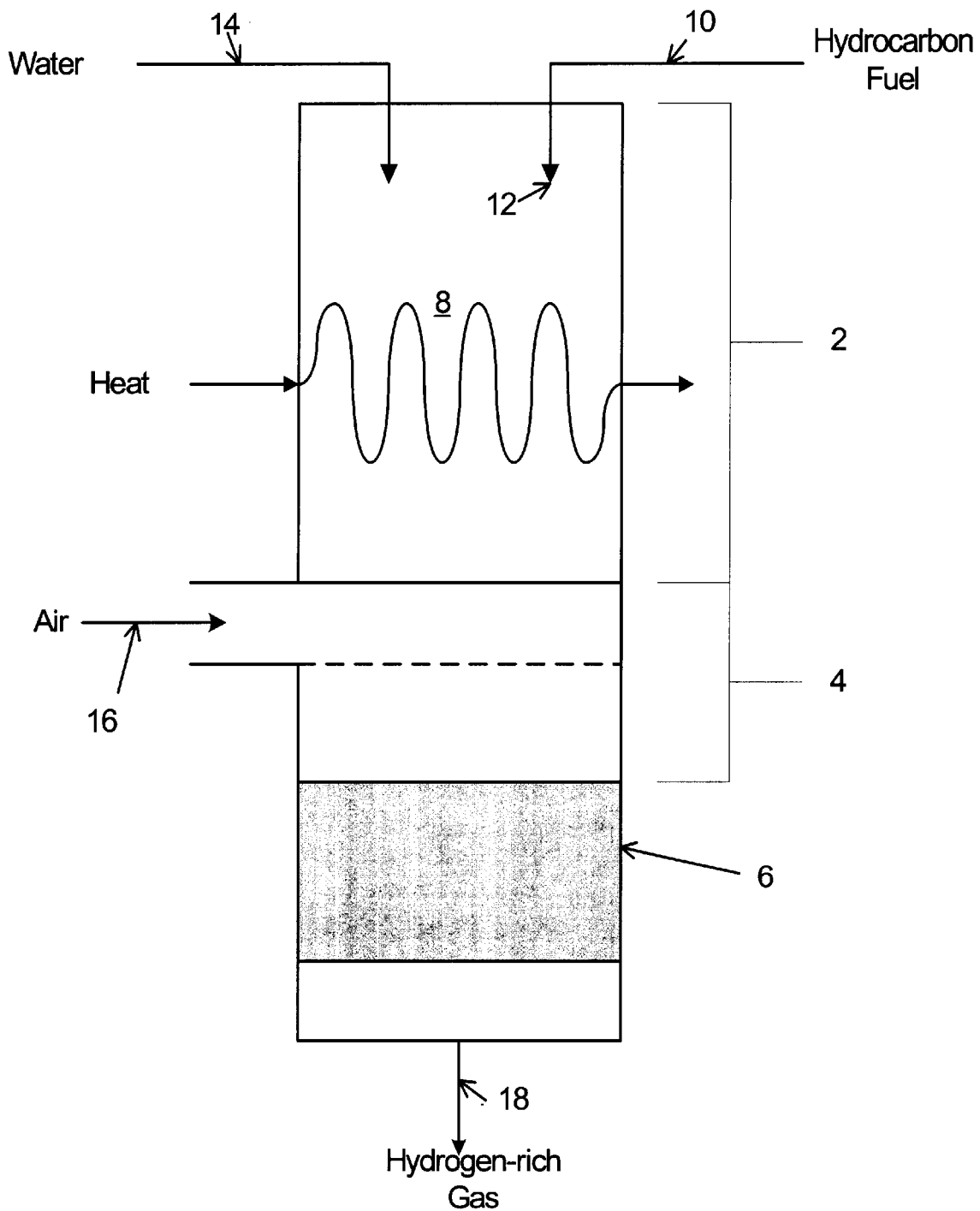

METHOD FOR CONTROLLING DEPOSITS IN THE FUEL REFORMER OF A FUEL CELL SYSTEM

FIELD OF THE INVENTION

This invention relates to a method for preventing the formation of deposits in the fuel reformer associated with a fuel cell system when liquid hydrocarbons are employed as a source of hydrogen.

BACKGROUND OF THE INVENTION

Fuel cells offer advantages over conventional internal combustion engines in certain applications. Fuel cells are usually more efficient and emit less pollutants into the environment when compared to heat engines. Accordingly, fuel cell systems are being proposed for both stationary and mobile applications which have traditionally been occupied by internal combustion engines. Several different types of fuel cells currently exist or are under development. Most types require hydrogen as a fuel which through an electrochemical conversion is used to generate electricity. The resulting electrical charge provides a source of electricity which may be used to power an electric motor. Unfortunately, hydrogen has a number of significant disadvantages as a practical fuel for commercial applications. In addition to being explosive, pure hydrogen is difficult and expensive to store. Therefore, other fuels such as natural gas and methanol which are easily converted to hydrogen at the site of the fuel cell have been proposed, but these fuels also have serious drawbacks. For example, methanol is expensive as a fuel, lacks an extensive distribution network, and presents groundwater pollution problems. Natural gas, while useful for stationary applications, is less practical for widespread use as a transportation fuel due to its storage and handling problems. Jet, diesel, gasoline and various refinery-blending streams have been suggested as a suitable alternative fuel for use in fuel cells if the sulfur content is reduced sufficiently. See U.S. Pat. No. 6,156,084. Gasoline has the advantage over other fuels of being relatively inexpensive, of already being widely available through a commercial distribution network, and of lacking the storage problems associated with gases such as hydrogen and natural gas.

Before a liquid hydrocarbon, such as gasoline, can be used to fuel a fuel cell, it must first be converted to hydrogen. This processing step is typically carried out in a fuel reformer which is included as an integral part of the fuel cell system. In the fuel reformer, the liquid hydrocarbon is usually vaporized in a heated chamber and passed over an active catalyst which converts the hydrocarbon into hydrogen and carbon dioxide. Typically the liquid hydrocarbon is sprayed into the heated vaporization chamber of the fuel reformer under pressure through one or more orifices opening into the chamber. It has not been previously recognized that deposits will form in these orifices. These deposits will eventually lead to the plugging of the orifice and inoperability of the fuel reformer. This problem has not been observed when gaseous hydrocarbons, such as methane or propane, are used as the fuel but appears to be unique to liquid hydrocarbon fuels. This problem becomes particularly acute when the liquid hydrocarbon is sprayed intermittently as would be expected in a fuel cell system used in a vehicle. However, even in fuel reformers which operate steadily as found in stationary fuel cell systems, deposits may build up over time eventually resulting in a loss of efficiency or in inoperability. Therefore, in order to insure long-term operation in a commercially viable fuel cell system, some method for controlling the formation of deposits is essential when a liquid hydrocarbon is used as the hydrogen source.

The use of detergents and other additive packages have been described for use in fuels intended for internal combustion engines. See for example U.S. Pat. Nos. 5,749,929 and 6,117,197. However, such additives previously have not been described as necessary for use with fuels intended for fuel cells.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrases "consisting of" or "consists of" are intended as a transition meaning the exclusion of all but the recited elements with the exception of only minor traces of impurities.

SUMMARY OF THE INVENTION

The present invention is directed to a method for controlling the deposits in the fuel vaporizer of a fuel reformer used to prepare a liquid hydrocarbon for use as a fuel in a fuel cell which comprises introducing into the fuel vaporizer a liquid hydrocarbon containing an effective deposit controlling amount of a nitrogen-containing detergent additive. Useful nitrogen-containing detergent additives according to the present invention include aliphatic hydrocarbyl amines, hydrocarbyl poly(oxyalkylene) amines, hydrocarbyl-substituted succinimides, Mannich reaction products, amino aromatic esters of polyalkylphenoxyalkanols, polyalkylphenoxyaminoalkanes, and mixtures thereof.

The present invention is also directed to a fuel composition suitable for use in a fuel cell which comprises a liquid hydrocarbon having a boiling range at atmospheric pressure falling between about 77 degrees F. (25 degrees C.) and about 437 degrees F. (225 degrees C.), a total sulfur content of less than 3 ppm, an octane rating of less than 85 (R+M)/2 and containing an effective deposit controlling amount of a nitrogen-containing detergent additive. Preferably the liquid hydrocarbon will predominantly comprise hydrotreated straight run gasoline, rerun alkylate, reformate, hydrotreated FCC gasoline, hydrotreated or desulfurized gasoline, or a mixture containing two or more of these. Additionally, a special fuel cell fuel may be prepared from a mixture of low sulfur gasoline blend streams and hydrotreated FCC light cycle oil, hydrotreated jet, hydrotreated diesel, and/or light coker gas oil. While the hydrocarbons listed may be present as components in gasoline, conventional gasoline is not ideal as a fuel for use in a fuel cell. Conventional gasoline has too high a total sulfur content to serve as a suitable fuel for certain types of fuel cell systems without treatment to remove the sulfur. For example, the catalysts used to convert the hydrogen and oxygen to electricity in a proton exchange membrane fuel cell are very sensitive to even very low levels of sulfur and are rapidly deactivated at the sulfur levels normally present in conventional gasoline which typically falls within the range of from about 50 to 500 ppm sulfur. Even the current reformulated gasoline with about 20 to 30 ppm sulfur would still have too much sulfur. Liquid hydrocarbons most suitable for use as a source of hydrogen for such a fuel cell should have a total sulfur content of less than 3 ppm, preferably less than 1 ppm, and most preferably below 0.5 ppm. While the fuel will contain mostly hydrocarbons, a significant amount of oxygenates, such as alcohols, and other components may also be present. Generally a fuel-soluble, non-volatile carrier can also be present to assist in solubilizing the detergent additive.

BRIEF DESCRIPTION OF THE DRAWING

The FIGURE is a schematic representation of a fuel reformer used to convert a liquid hydrocarbon into a hydrogen-rich gas.

DETAILED DESCRIPTION OF THE INVENTION

Fuel cells convert chemical energy of a fuel directly into electricity. They do this electrochemically, without fuel combustion and without heat engine mechanical intermediaries like boiler/steam turbines, gas turbines, or internal combustion engines. Hydrogen is the fuel of choice for fuel cells because of its high reactivity in the presence of catalyst and its ready availability from hydrocarbons by reforming. Fuel cells have been suggested as a lower polluting and more efficient alternative to internal combustion engines, including applications for stationary uses, such as electric power generation, and mobile applications, such as for powering vehicles.

Several types of fuel cells are currently under commercial development. The proton exchange membrane fuel cell, usually referred to as the PEM fuel cell, is the embodiment most suited to transportation applications. PEM fuel cells are rugged, compact, able to operate at relatively low temperatures, able to respond quickly to load changes, and potentially relatively less expensive to manufacture than other designs. The PEM fuel cell uses hydrogen as the fuel and oxygen, typically from the air, as the oxidant. Hydrogen gas is ionized at the anode side of the cell by a catalyst, usually a platinum-on-carbon catalyst, and releases an electron. The electron flows through an external circuit to perform work in the circuit, for example by running a motor. At the same time, the proton diffuses through the proton exchange membrane which serves as a solid electrolyte to the cathode of the fuel cell. Once at the cathode, the protons are combined with oxygen and the electrons to produce water.

Other types of fuel cells are also under commercial development. After PEM fuel cells, solid oxide fuel cells are expected to have the best commercial prospects. Solid oxide fuel cells operate at a high temperature and use a solid ceramic electrolyte, typically made of yttria-stabilized zirconia. Solid oxide fuel cell systems are well suited for larger stationary applications because of their potential for high electrical generation efficiency. Other types of fuel cells include alkaline fuel cells, phosphoric acid fuel cells, and molten carbonate fuel cells.

Due to the high cost and difficulty of storing pure hydrogen, fuel reformers are under development to reform more commonly available hydrocarbon fuels into hydrogen as part of an integrated fuel cell system. Gasoline and other hydrocarbon fuels do not have enough electrochemical reactivity to be used directly in PEM or other types of fuel cells. A fuel reformer is needed to convert the fuels to hydrogen-rich gases that provide hydrogen at the fuel cell anode. In general, almost any liquid hydrocarbons may be reformed to produce a hydrogen-rich gas. Accordingly, distillate fuels, such as diesel and naphtha, may be used. The term "distillate fuels" refers to fuels, blends, or components of blends generated from vaporized fractionation overhead streams. Distillate fuels include hydrocarbons having a boiling range which falls between approximately 32 degrees F. (0 degrees C.) and 1100 degrees F. (593 degrees C.). However, lower boiling hydrocarbons are easier to vaporize and are generally preferred. Therefore, hydrocarbons which have a boiling range falling between about 32 degrees F. (0 degrees C.) and about 650 degrees F. (343 degrees C.) are generally preferred. Even more preferred are hydrocarbons boiling between about 77 degrees F. (25 degrees C.) and about 437 degrees F. (225 degrees C.). The liquid hydrocarbons may be relatively homogenous, i.e. be made up of hydrocarbons having a specified number of carbon atoms, however, typically they will consist of a blend of various hydrocarbons having a specified dew point.

Gasoline or the various components of gasoline have been proposed as a source of hydrogen through reforming, since it is readily available in large quantities through an existing commercial distribution system. Gasoline as it is sold at the pump is generally prepared from a number of blend streams. Typical blend components include butanes, light straight run, isomerate, FCC cracked products, hydrocracked naphtha, coker gasoline, alkylate, reformate, added ethers, etc. However, a principal disadvantage of gasoline as a fuel for use in fuel cells is its sulfur content. Hydrocarbons intended for fuel cells require a significantly lower sulfur content than is seen in conventional or reformulated gasoline, which typically falls within the range of from about 20 to 500 ppm. Hydrocarbons intended for use as a fuel cell should contain less than 3 ppm total sulfur, preferably less than 1 ppm and even more preferably below 0.5 ppm. For this reason, low sulfur gasoline blend stocks, such as, for example, hydrotreated straight run gasoline, rerun alkylate, reformate, and hydrotreated FCC gasoline, represent a preferred choice over gasoline. Alternatively, a conventional gasoline may be hydrotreated or otherwise desulfurized resulting in a product that may or may not meet the octane requirements for an internal combustion engine but would otherwise be ideally suited for use in a fuel cell reformer. Hydrotreating a conventional gasoline will saturate the majority of the olefins and possibly some of the aromatic rings resulting in a fuel with an octane rate, (R+M)/2, of less than 85 commonly less than 83. Particularly preferred as hydrocarbon fuels for use in a fuel cell are the low sulfur gasoline blending stocks and/or a hydrotreated regular grade gasoline.

Although the hydrocarbons intended for use in fuel cells are normally a liquid at atmospheric pressure and room temperature, lower boiling hydrocarbons may be present also. Hydrocarbons containing less than six carbon atoms, such as pentane, butane, and propane, may be present provided that the total fuel composition does not exceed the desired vapor pressure limit.

In addition to the hydrocarbons, oxygenates, generally alcohols, may be present in significant quantities. Methanol especially has been proposed as a fuel for use in a fuel cell. In the present invention, lower alcohols, such as methanol, ethanol, and isopropyl alcohol may be present in the fuel composition in amounts up to about 15 percent by weight. Other components typically found in fuel blends include, but are not necessarily limited to, dimethylcarbonate, MTBE, and TAME. Additives, such as dispersants and anti-oxidants, may also be present to improve the stability or physical properties of the fuel. Although conventional gasoline and diesel usually contain additives which are intended to improve engine performance, such as, for example, octane improvers and ignition promoters, which are not needed in a fuel intended for a fuel cell, such additives also may be present so long as they do not adversely affect the operation of the fuel cell system. When steam reforming is used, water may also be present in the fuel composition.

In order to further clarify the invention, a simple schematic representation of an autothermal reformer of the general type which may be used to reform a liquid hydrocarbon into a hydrogen-rich gas is illustrated in the FIGURE. The reformer shown may be divided into three regions which each have a different function in the reforming operation. These regions comprise a vaporization chamber 2 which contains a heat exchanger 8, a mixing region 4 where the steam and vaporized fuel are mixed with air, and a catalyst bed 6. In operation, the liquid hydrocarbon fuel enters via line 10 and is sprayed into the vaporization chamber through an orifice which would be located at the outlet 12 of line 10. Water enters the vaporization chamber by means of line 14. The vaporization chamber is heated to a temperature sufficient to vaporize both the hydrocarbon and the water by means of the heat exchanger 8. The vaporized hydrocarbon and steam mixture is mixed with air entering via line 16. The air/steam/hydrocarbon mixture flows through the catalyst bed 6 which contains an active catalyst, typically a supported nickel or platinum group metal catalyst, that converts the mixture into a hydrogen-rich gas which is collected and exits the reformer via outlet 18. A more detailed description of this design of reformer may be found in WO 00/72954. Other designs have been proposed. For example, WO 00/72954 also describes a reformer in which a steam/air mixture is heated together first and then the hydrocarbon is injected into the hot steam/air mixture just prior to the catalyst bed. A partial oxidation reforming process described in U.S. Pat. No. 4,087,259 teaches that the fuel is first vaporized and then mixed with air just prior to the catalyst bed. International publication WO 99/19249 teaches an embodiment in which the fuel is sprayed into a hot air stream prior to contact with the reforming catalyst. In each of these designs, there is the potential for deposits to form in the orifice through which the hydrocarbon enters the reformer. In addition, deposits may also form within the reformer on the chamber walls, on the heat exchange coils, or in the catalyst bed. In each instance, the present invention also may be used to control the formation of deposits in these areas.

For proper operation, it is essential that precisely controlled quantities of fuel be mixed with the air and steam in the reformer. In autothermal reforming, the oxygen (as $O_2$) to carbon ratio typically ranges from about 0.2 to about 0.5, more preferably from about 0.3 to about 0.45, while the steam to carbon mole ratio ranges from about 1 to about 4, more preferably from about 2 to about 3. As noted above, the hydrocarbons are sprayed through an orifice or series of orifices into the heated vaporization chamber. The size of the orifice or orifices will vary depending upon such factors as the density of fuel, the pressure at which the fuel is sprayed, and the number of orifices in the fuel reformer. It may be desirable to use a system with a large number of orifices, thereby insuring even distribution of the fuel with the steam and/or air. Thus, the typical orifice will generally fall within the range of from about 30 microns to about 200 microns in diameter. It has been found that when the hydrocarbons are sprayed intermittently as would be expected in a fuel reformer associated with a vehicle, a deposit will form which will quickly plug up the orifice. The accumulation of these deposits will interfere with the proper operation of the reformer or even render it inoperable after a short period of time. In order to control the accumulation of deposits both in the orifice and on the surfaces inside of the reformer, it is advantageous to include in the hydrocarbon fuel composition an effective deposit controlling amount of a nitrogen-containing detergent additive. Although such deposits have not been reported previously in fuel reformers under continuous operation, it is likely that such deposits may also form over an extended period of operation. As used herein the phrase "effective deposit controlling amount" or variations thereof means the minimum amount of deposit control additive necessary to prevent the plugging of the orifice in the fuel reformer under the mode of operation under which the reformer is intended to be operated. Obviously the effective deposit controlling amount of the detergent will vary with a number of factors, such as, for example, the size of the orifice, the composition of the fuel, the temperature of the vaporization chamber, and whether the fuel cell is operated intermittently or continuously. The term "deposit control" or variations thereof, is meant to include the prevention, reduction or elimination of deposits in the orifice or within the fuel reformer. In general, the amount of the deposit control additive will fall within the range of from about 25 ppm to about 2500 ppm, with amounts between about 35 ppm and about 1000 ppm being preferred.

The nitrogen-containing detergent additives which may be employed in carrying out the present invention include aliphatic hydrocarbyl amines, hydrocarbyl poly (oxyalkylene) amines, hydrocarbyl-substituted succinimides, Mannich reaction products, amino aromatic esters of polyalkylphenoxyalkanols, polyalkylphenoxyaminoalkanes, and mixtures thereof.

The aliphatic hydrocarbyl-substituted amines which may be employed in the present invention are typically straight or branched chain hydrocarbyl-substituted amines having at least one basic nitrogen atom and wherein the hydrocarbyl group has a number average molecular weight of about 700 to 3,000. Preferred aliphatic hydrocarbyl-substituted amines include polyisobutenyl and polyisobutyl monoamines and polyamines.

The aliphatic hydrocarbyl amines employed in this invention are prepared by conventional procedures known in the art. Such aliphatic hydrocarbyl amines and their preparations are described in detail in U.S. Pat. Nos. 3,438,757; 3,565,804; 3,574,576; 3,848,056; 3,960,515; 4,832,702; and 6,203,584, the disclosures of which are incorporated herein by reference.

Another class of detergent additives suitable for use in the present invention is the hydrocarbyl poly(oxyalkylene) amines, also referred to as polyether amines. Typical hydrocarbyl poly(oxyalkylene) amines include hydrocarbyl poly (oxyalkylene) monoamines and polyamines wherein the hydrocarbyl group contains from 1 to about 30 carbon atoms, the number of oxyalkylene units will range from about 5 to 100, and the amine moiety is derived from ammonia, a primary alkyl or secondary dialkyl monoamine, or a polyamine having a terminal amino nitrogen atom. Preferably, the oxyalkylene moiety will be oxypropylene or oxybutylene or a mixture thereof. Such hydrocarbyl poly (oxyalkylene) amines are described, for example, in U.S. Pat. No. 6,217,624 to Morris et al., and U.S. Pat. No. 5,112,364 to Rath et al., the disclosures of which are incorporated herein by reference.

A preferred type of hydrocarbyl poly(oxyalkylene) monoamine is an alkyl or alkylphenyl poly(oxyalkylene) monoamine wherein the poly(oxyalkylene) moiety contains oxypropylene units or oxybutylene units or mixtures of oxypropylene and oxybutylene units. Preferably, the alkyl substituent or the alkyl group on the alkylphenyl moiety is a straight or branched-chain alkyl of 1 to 24 carbon atoms.

An especially preferred alkylphenyl moiety is tetrapropenylphenyl, that is, where the alkyl group is a branched-chain alkyl of carbon atoms derived from propylene tetramer.

An additional type of substituted poly(oxyalkylene)amine finding use in the present invention are hydrocarbyl poly (oxyalkylene) aminocarbamates disclosed for example, in U.S. Pat. Nos. 4,288,612; 4,236,020; 4,160,648; 4,191,537; 4,270,930; 4,233,168; 4,197,409; 4,243,798 and 4,881,945, the disclosure of each of which are incorporated herein by reference.

These hydrocarbyl poly(oxyalkylene)aminocarbamates contain at least one basic nitrogen atom and have an average molecular weight of about 500 to 10,000, preferably about 500 to 5,000, and more preferably about 1,000 to 3,000. A preferred aminocarbamate is alkylphenyl poly(oxybutylene) aminocarbamate wherein the amine moiety is derived from ethylene diamine or diethylene triamine.

A further class of detergent additives suitable for use in the present invention is the hydrocarbyl-substituted succinimides. Typical hydrocarbyl-substituted succinimides include polyalkyl and polyalkenyl succinimides wherein the polyalkyl or polyalkenyl group has an average molecular weight of about 500 to 5,000, and preferably about 700 to 3,000. The hydrocarbyl-substituted succinimides are typically prepared by reacting a hydrocarbyl-substituted succinic anhydride with a polyamine having at least one reactive hydrogen bonded to an amine nitrogen atom. Preferred hydrocarbyl-substituted succinimides include polyisobutenyl and polyisobutanyl succinimides, and derivatives thereof.

The hydrocarbyl-substituted succinimides finding use in the present invention are described, for example, in U.S. Pat. Nos. 5,393,309; 5,588,973; 5,620,486; 5,916,825; 5,954,843; 5,993,497; and 6,114,542, and British Patent No.1,486,144, the disclosure of each of which are incorporated herein by reference.

Yet another class of detergent additives which may be employed in the present invention are Mannich reaction products which are typically obtained from the Mannich condensation of a high molecular weight alkyl-substituted hydroxyaromatic compound, an amine containing at least one reactive hydrogen, and an aldehyde. The high molecular weight alkyl-substituted hydroxyaromatic compounds are preferably polyalkylphenols, such as polypropylphenol and polybutylphenol, especially polyisobutylphenol, wherein the polyakyl group has an average molecular weight of about 600 to 3,000. The amine reactant is typically a polyamine, such as alkylene polyamines, especially ethylene or polyethylene polyamines, for example, ethylene diamine, diethylene triamine, 3-dimethylaminopropylamine, 2-aminoethylpipeazine, triethylene tetramine, and the like. The aldehyde reactant is generally an aliphatic aldehyde, such as formaldehyde, including paraformaldehyde and formalin, and acetaldehyde. A preferred Mannich reaction product is obtained by condensing a polyisobutylphenol with formaldehyde and polyamine, wherein the polyisobutyl group has an average molecular weight of about 1,000.

The Mannich reaction products suitable for use in the present invention are described, for example, in U.S. Pat. Nos. 4,231,759 and 5,697,988, the disclosures of each of which are incorporated herein by reference.

A still further class of detergent additives suitable for use in the present invention are the polyalkylphenoxyaminoalkanes. Preferred polyalkylphenoxyaminoalkanes include those having the formula:

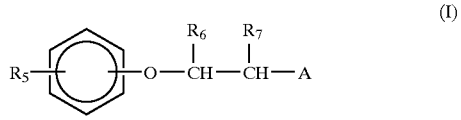

wherein:

$R_5$ is a polyalkyl group having an average molecular weight in the range of about 600 to 5,000;

$R_6$ and $R_7$ are independently hydrogen or lower alkyl having 1 to 6 carbon atoms; and A is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms.

The polyalkylphenoxyaminoalkanes of Formula I above and their preparations are described in detail in U.S. Pat. No. 5,669,939, the disclosure of which is incorporated herein by reference.

Mixtures of polyalkylphenoxyaminoalkanes and poly (oxyalkylene) amines are also suitable for use in the present invention. These mixtures are described in detail in U.S. Pat. No. 5,851,242, the disclosure of which is incorporated herein by reference.

A preferred class of detergent additive finding use in the present invention is the nitro and amino aromatic esters of polyalkylphenoxyalkanols. Preferred amino aromatic esters of polyalkylphenoxyalkanols include those having the formula:

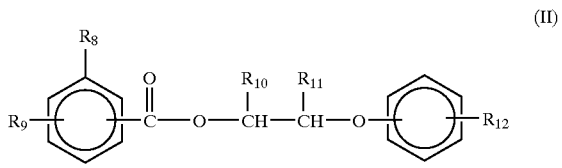

wherein:

$R_8$ is —$(CH_2)_n$—$NR_{13}R_{14}$, wherein $R_{13}$ and $R_{14}$ are independently hydrogen or lower alkyl having 1 to 6 carbon atoms and n is 0 or 1;

$R_9$ is hydrogen, hydroxy, nitro or —$NR_{15}R_{16}$, wherein $R_{15}$ and $R_{16}$ are independently hydrogen or lower alkyl having 1 to 6 carbon atoms;

$R_{10}$ and $R_{11}$ are independently hydrogen or lower alkyl having 1 to 6 carbon atoms; and $R_{12}$ is a polyalkyl group having an average molecular weight in the range of about 450 to 5,000.

The aromatic esters of polyalkylphenoxyalkanols shown in Formula II above and their preparations are described in detail in U.S. Pat. No. 5,618,320, the disclosure of which is incorporated herein by reference.

Mixtures of amino aromatic esters of polyalkylphenoxyalkanols and hydrocarbyl poly(oxyalkylene) amines are also preferably contemplated for use in the present invention. These mixtures are described in detail in U.S. Pat. No. 5,749,929, the disclosure of which is incorporated herein by reference.

Preferred hydrocarbyl poly(oxyalkylene) amines which may be employed as detergent additives in the present invention include those having the formula:

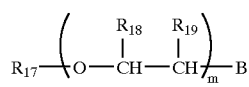

wherein:
- $R_{17}$ is a hydrocarbyl group having from about 1 to about 30 carbon atoms;
- $R_{18}$ and $R_{19}$ are each independently hydrogen or lower alkyl having about 1 to about 6 carbon atoms and each $R_{18}$ and $R_{19}$ is independently selected in each —O—$CHR_{18}$—$CHR_{19}$—unit;
- B is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and
- m is an integer from about 5 to about 100.

The hydrocarbyl poly(oxyalkylene) amines of Formula III above and their preparations are described in detail in U.S. Pat. No. 6,217,624, the disclosure of which is incorporated herein by reference.

The hydrocarbyl poly(oxyalkylene) amines of Formula III are preferably utilized either by themselves or in combination with other detergent additives, particularly with the polyalkylphenoxyaminoalkanes of Formula I or the amino aromatic esters of polyalkylphenoxyalkanols shown in Formula II. More preferably, the detergent additives employed in the present invention will be combinations of the hydrocarbyl poly(oxyalkylene) amines of Formula III with the amino aromatic esters of polyalkylphenoxyalkanols shown in Formula II. A particularly preferred hydrocarbyl poly (oxyalkylene) amine detergent additive is dodecylphenoxy poly(oxybutylene) amine and a particularly preferred combination of detergent additives is the combination of dodecylphenoxy poly(oxybutylene) amine and 4-polyisobutylphenoxyethyl para-aminobenzoate.

Another type of detergent additive suitable for use in the present invention is the nitrogen-containing carburetor/injector detergent. The carburetor/injector detergent additives are typically relatively low molecular weight compounds having a number average molecular weight of about 100 to about 600 and possessing at least one polar moiety and at least one non-polar moiety. The non-polar moiety is typically a linear or branched-chain alkyl or alkenyl group having about 6 to about 40 carbon atoms. The polar moiety is typically nitrogen-containing. Typical nitrogen-containing polar moieties include amines (for example, as described in U.S. Pat. No. 5,139,534 and PCT International Publication No. WO 90/10051), ether amines (for example, as described in U.S. Pat. No. 3,849,083 and PCT International Publication No. WO 90/10051), amides, polyamides and amide-esters (for example, as described in U.S. Pat. Nos. 2,622,018; 4,729,769; and 5,139,534; and European Patent Publication No. 149,486), imidazolines (for example, as described in U.S. Pat. No. 4,518,782), amine oxides (for example, as described in U.S. Pat. Nos. 4,810,263 and 4,836,829), hydroxyamines (for example, as described in U.S. Pat. No. 4,409,000), and succinimides (for example, as described in U.S. Pat. No. 4,292,046).

A fuel-soluble, nonvolatile carrier fluid or oil may also be used with the nitrogen-containing detergent additive employed in the present invention. The carrier fluid is a chemically inert hydrocarbon-soluble liquid vehicle which substantially increases the nonvolatile residue (NVR), or solvent-free liquid fraction of the nitrogen-containing detergent additive while not adversely affecting the reforming operation. The carrier fluid may be a natural or synthetic fluid, such as mineral oil, refined petroleum oils, synthetic polyalkanes and alkenes, including hydrogenated and unhydrogenated polyalphaolefins, and synthetic polyoxyalkylene-derived fluids, such as those described, for example, in U.S. Pat. No. 4,191,537 to Lewis, and polyesters, such as those described, for example, in U.S. Pat. Nos. 3,756,793 to Robinson and U.S. Pat. No. 5,004,478 to Vogel et al., and in European Patent Application Nos. 356,726, published Mar. 7, 1990, and 382,159, published Aug. 16, 1990. The use of aromatic di- and tri-carboxylic acid esters, such as phthalate esters, is also described in U.S. Pat. Nos. 5,405,418 to Ansari et al. and U.S. Pat. No. 6,117,197 to Houser.

These carrier fluids are believed to act as a carrier for the nitrogen-containing detergent additive employed in the present invention and to assist in removing and retarding deposits. The carrier fluid may also exhibit synergistic deposit control properties when used in combination with the nitrogen-containing detergent additive employed in this invention.

The carrier fluids are typically employed in amounts ranging from about 25 to about 2500 ppm by weight of the hydrocarbon fuel, preferably from about 35 to about 1000 ppm of the fuel.

The following examples are intended to further illustrate the invention but are not to be construed as limitations thereon.

EXAMPLES

Unless expressly stated to the contrary, in the following examples all temperatures and temperature ranges refer to the Centigrade system and the term "ambient" or "room temperature" refers to about 20° C. to 25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume. Where given, proton-magnetic resonance spectrum (p.m.r. or n.m.r.) were determined at 300 mHz, signals are assigned as singlets (s), broad singlets (bs), doublets (d), double doublets (dd), triplets (t), double triplets (dt), quartets (q), and multiplets (m), and cps refers to cycles per second.

Example 1

Preparation of Polyisobutyl Phenol

To a flask equipped with a magnetic stirrer, reflux condenser, thermometer, addition funnel and nitrogen inlet was added 203.2 grams of phenol. The phenol was warmed to 40° C. and the heat source was removed. Then, 73.5 milliliters of boron trifluoride etherate was added dropwise. 1040 grams of Ultravis 10 Polyisobutene (molecular weight 950, 76% methylvinylidene, available from British Petroleum) was dissolved in 1,863 milliliters of hexane. The polyisobutene was added to the reaction at a rate to maintain the temperature between 22° C. to 27° C. The reaction mixture was stirred for 16 hours at room temperature. Then, 400 milliliters of concentrated ammonium hydroxide was added, followed by 2,000 milliliters of hexane. The reaction mixture was washed with water (3×2,000 milliliters), dried over magnesium sulfate, filtered and the solvents removed under vacuum to yield 1,056.5 grams of a crude reaction product. The crude reaction product was determined to contain 80% of the desired product by proton NMR and chromatography on silica gel eluting with hexane, followed by hexane: ethylacetate:ethanol (93:5:2).

Example 2

Preparation of

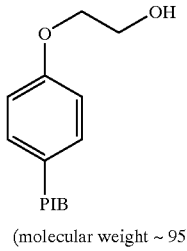

(molecular weight ~ 950)

1.1 grams of a 35 weight percent dispersion of potassium hydride in mineral oil and 4-polyisobutyl phenol (99.7 grams, prepared as in Example 1) were added to a flask equipped with a magnetic stirrer, reflux condenser, nitrogen inlet and thermometer. The reaction was heated at 130° C. for one hour and then cooled to 100° C. Ethylene carbonate (8.6 grams) was added and the mixture was heated at 160° C. for 16 hours. The reaction was cooled to room temperature and one milliliter of isopropanol was added. The reaction was diluted with one liter of hexane, washed three times with water and once with brine. The organic layer was dried over anhydrous magnesium sulfate, filtered and the solvents removed in vacuo to yield 98.0 grams of the desired product as a yellow oil.

Example 3

Preparation of

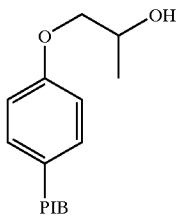

(molecular weight ~ 950)

15.1 grams of a 35 weight percent dispersion of potassium hydride in mineral oil and 4-polyisobutyl phenol (1378.5 grams, prepared as in Example 1) were added to a flask equipped with a mechanical stirrer, reflux condenser, nitrogen inlet and thermometer. The reaction was heated at 130° C. for one hour and then cooled to 100° C. Propylene carbonate (115.7 milliliters) was added and the mixture was heated at 160° C. for 16 hours. The reaction was cooled to room temperature and ten milliliters of isopropanol were added. The reaction was diluted with ten liters of hexane, washed three times with water and once with brine. The organic layer was dried over anhydrous magnesium sulfate, filtered and the solvents removed in vacuo to yield 1301.7 grams of the desired product as a yellow oil.

Example 4

Preparation of

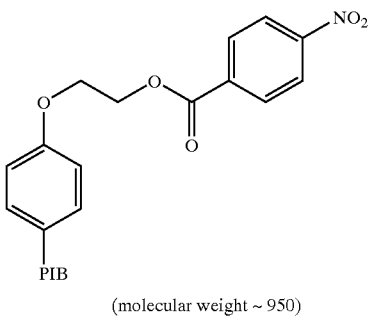

(molecular weight ~ 950)

To a flask equipped with a magnetic stirrer, thermometer, Dean-Stark trap, reflux condenser and nitrogen inlet was added 15.0 grams of the alcohol from Example 2, 2.6 grams of 4-nitrobenzoic acid and 0.24 grams of p-toluenesulfonic acid. The mixture was stirred at 130° C. for sixteen hours, cooled to room temperature and diluted with 200 mL of hexane. The organic phase was washed twice with saturated aqueous sodium bicarbonate followed by once with saturated aqueous sodium chloride. The organic layer was then dried over anhydrous magnesium sulfate, filtered and the solvents removed in vacuo to yield 15.0 grams of the desired product as brown oil. The oil was chromatographed on silica gel, eluting with hexane/ethyl acetate (9:1) to afford 14.0 grams of the desired ester as yellow oil. $^1$H NMR (CDCl$_3$) d 8.3 (AB quartet, 4H), 7.25 (d, 2H), 6.85 (d, 2H), 4.7 (t, 2H), 4.3 (t, 2H), 0.7–1.6 (m, 137H).

Example 5

Preparation of

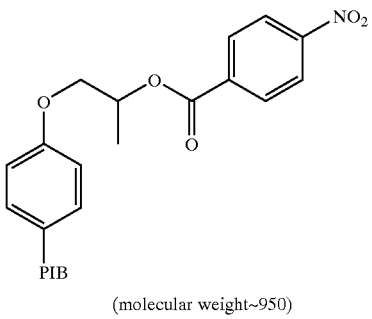

(molecular weight~950)

To a flask equipped with a magnetic stirrer, thermometer, Dean-Stark trap, reflux condenser and nitrogen inlet was added 15.0 grams of the alcohol from Example 3, 2.7 grams of 4-nitrobenzoic acid and 0.23 grams of p-toluenesulfonic acid. The mixture was stirred at 130° C. for sixteen hours, cooled to room temperature and diluted with 200 mL of hexane. The organic phase was washed twice with saturated aqueous sodium bicarbonate followed by once with saturated aqueous sodium chloride. The organic layer was then dried over anhydrous magnesium sulfate, filtered and the solvents removed in vacuo to yield 16.0 grams of the desired product as brown oil. The oil was chromatographed on silica gel, eluting with hexane/ethyl acetate (8:2) to afford 15.2 grams of the desired ester as brown oil. $^1$H NMR (CDCl$_3$) d 8.2 (AB quartet, 4H), 7.25 (d, 2H), 6.85 (d, 2H), 5.55 (hx, 1H), 4.1 (t, 2H), 0.6–1.8 (m, 140H).

Example 6

Preparation of

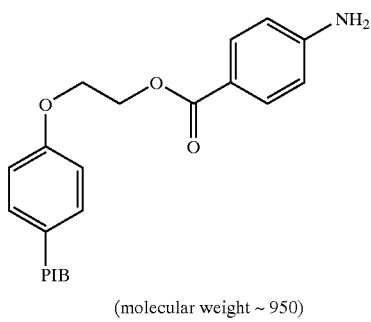

(molecular weight ~ 950)

A solution of 9.4 grams of the product from Example 4 in 100 milliliters of ethyl acetate containing 1.0 gram of 10% palladium on charcoal was hydrogenolyzed at 35–40 psi for 16 hours on a Parr low-pressure hydrogenator. Catalyst filtration and removal of the solvent in vacuo yield 7.7 grams of the desired product as yellow oil. $^1$H NMR (CDCl$_3$) d 7.85 (d, 2H), 7.3 (d, 2H), 6.85 (d, 2H), 6.6 (d, 2H), 4.6 (t, 2H), 4.25 (t, 2H), 4.05 (bs, 2H), 0.7–1.6 (m, 137H).

Example 7

Preparation of

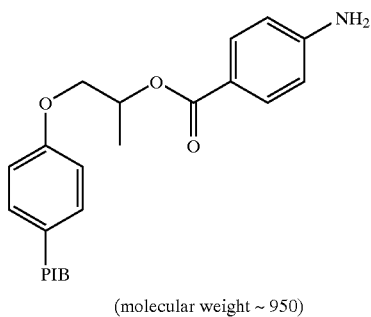

(molecular weight ~ 950)

A solution of 15.2 grams of the product from Example 5 in 200 milliliters of ethyl acetate containing 1.0 gram of 10% palladium on charcoal was hydrogenolyzed at 35–40 psi for 16 hours on a Parr low-pressure hydrogenator. Catalyst filtration and removal of the solvent in vacuo yield 15.0 grams of the desired product as brown oil. $^1$H NMR (CDCl$_3$/ D$_2$O) d 7.85 (d, 2H), 7.25 (d, 2H), 6.85 (d, 2H), 6.6 (d, 2H), 5.4 (hx, 1H), 3.8–4.2 (m, 4H), 0.6–1.8 (m, 140H).

Example 8

Preparation of Dodecylphenoxy Poly(oxybutylene) Poly(oxypropylene) Amine

A dodecylphenoxypoly(oxybutylene)poly(oxypropylene) amine was prepared by the reductive amination with ammonia of the random copolymer poly(oxyalkylene) alcohol, dodecylphenoxy poly(oxybutylene)poly(oxypropylene) alcohol, wherein the alcohol has an average molecular weight of about 1598. The poly(oxyalkylene) alcohol was prepared from dodecylphenol using a 75/25 weight/weight ratio of butylene oxide and propylene oxide, in accordance with the procedures described in U.S. Pat. Nos. 4,191,537; 2,782,240 and 2,841,479, as well as in Kirk-Othmer, "Encyclopedia of Chemical Technology", 4th edition, Volume 19, 1996, page 722. The reductive amination of the poly (oxyalkylene) alcohol was carried out using conventional techniques as described in U.S. Pat. Nos. 5,112,364; 4,609, 377 and 3,440,029.

Example 9

Preparation of Dodecylphenoxy Poly(oxybutylene) Amine

A dodecylphenoxy poly(oxybutylene) amine was prepared by the reductive amination with ammonia of a dodecylphenoxy poly(oxybutylene) alcohol having an average molecular weight of about 1600. The dodecylphenoxy poly (oxybutylene) alcohol was prepared from dodecylphenol and butylene oxide, in accordance with the procedures described in U.S. Pat. Nos. 4,191,537; 2,782,240, and 2,841, 479, as well as in Kirk-Othmer, "Encyclopedia of Chemical Technology", 4th edition, Volume 19, 1996, page 722. The reductive amination of the dodecylphenoxy poly (oxybutylene) alcohol was carried out using conventional techniques as described in U.S. Pat. Nos. 5,112,364; 4,609, 377; and 3,440,029.

Example 10

Plugging Test Using Gasoline Without Additive Sprayed Through a Heated Orifice

The conditions in the vaporization chamber of a fuel reformer were simulated by placing a regular unleaded gasoline containing no deposit control additive in a syringe pump (Harvard Apparatus Model 44) and pumping the fuel through a 12 micron orifice made from 316 stainless steel at a rate of 10 ml/hr into a heated chamber continuously flushed with nitrogen gas. The temperature of the orifice was kept at a temperature of approximately 66 degrees C. Starting with a clean orifice, it was possible to maintain the flow through the orifice. However, once the pump was stopped, it became impossible to restart the pump. The orifice was found to be plugged. The plugged orifice was cleaned by burning away the deposits in a furnace at 500 degrees C. The test was repeated. When the pump was stopped the orifice became plugged again, and the pump could not be restarted.

Example 11

Plugging Test Using Gasoline With Additive Sprayed Through a Heated Orifice

The test described in Example 10 was repeated, except a deposit control additive mixture was added to the gasoline in an amount giving the following concentrations in the fuel:

| | |
|---|---|
| Dodecylphenoxy poly(oxybutylene) amine | 175 ppm |
| 4-Polyisobutylphenoxyethyl para-aminobenzoate | 29 ppm |
| Emkarate 1020 (di- isodecyl phthalate) | 67 ppm |

The pump was started and shut-off 30 times during the test without any plugging of the orifice.

A comparison of the results of examples 10 and 11 illustrate that the presence of a nitrogen-containing deposit control additive will control the accumulation of deposits and prevent plugging of the orifice during intermittent operation as would be expected during operation of a fuel reformer in a vehicle.

What is claimed is:

1. A method for controlling deposits in the fuel vaporizer of a fuel reformer used to prepare a liquid hydrocarbon for use as a fuel in a fuel cell which comprises introducing into the fuel vaporizer a liquid hydrocarbon containing an effective deposit controlling amount of a nitrogen-containing detergent additive.

2. The method of claim 1 wherein the nitrogen-containing detergent additive is selected from the group consisting of aliphatic hydrocarbyl amines, hydrocarbyl poly(oxyalkylene) amines, hydrocarbyl-substituted succinimides, Mannich reaction products, nitro and amino aromatic esters of polyalkylphenoxyalkanols, polyalkylphenoxyaminoalkanes, and mixtures thereof.

3. The method of claim 2 wherein the nitrogen-containing detergent additive includes at least one aliphatic hydrocarbyl amine.

4. The method of claim 3 wherein the aliphatic hydrocarbyl amine is selected from the group consisting of polyisobutenyl and polyisobutyl monoamine and polyamine.

5. The method of claim 2 wherein the nitrogen-containing detergent additive includes at least one hydrocarbyl poly(oxyalkylene) amine.

6. The method of claim 5 wherein the hydrocarbyl poly(oxyalkylene) amine is selected from the group consisting of hydrocarbyl poly(oxyalkylene) monoamines and polyamines wherein the hydrocarbyl group contains from 1 to about 30 carbon atoms, the number of oxyalkylene units will range from about 5 to 100, and the amine moiety is derived from ammonia, a primary alkyl or secondary dialkyl monoamine, or a polyamine having a terminal amino nitrogen atom.

7. The method of claim 6 wherein the hydrocarbyl poly(oxyalkene) amine is a alkylphenyl poly(oxyalkylene) monoamine, wherein the poly(oxyalkylene) moiety contains oxypropylene or oxybutylene units or a mixture of oxypropylene and oxybutylene units.

8. The method of claim 5 wherein the hydrocarbyl poly(oxyalkylene) amine is a hydrocarbyl poly(oxyalkylene) aminocarbamate.

9. The method of claim 5 wherein the hydrocarbyl poly(oxyalkylene) amine is characterized by the formula:

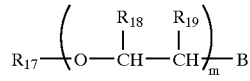

wherein:
R$_{17}$ is a hydrocarbyl group having from about 1 to about 30 carbon atoms;
R$_{18}$ and R$_{19}$ are each independently hydrogen or lower alkyl having about 1 to about 6 carbon atoms and each R$_{18}$ and R$_{19}$ is independently selected in each —O—CHR$_{18}$—CHR$_{19}$— unit;
B is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and
m is an integer from about 5 to about 100.

10. The method of claim 2 wherein the nitrogen-containing detergent additive includes at least one hydrocarbyl-substituted succinimide.

11. The method of claim 10 wherein the hydrocarbyl-substituted succinimide is a polyalkyl or polyalkenyl succinimide wherein the polyalkyl or polyalkenyl moiety has an average molecular weight of from about 500 to about 5,000.

12. The method of claim 2 wherein the nitrogen-containing detergent additive includes at least one Mannich reaction product.

13. The method of claim 12 wherein the Mannich reaction product is obtained by condensing a polyalkylphenol with an aliphatic aldehyde and an alkylene polyamine.

14. The method of claim 2 wherein the nitrogen-containing detergent additive includes at least one amino aromatic ester of polyalkylphenoxyalkanol.

15. The method of claim 14 wherein the amino aromatic ester of a polyalkylphenoxyalkanol is characterized by the formula:

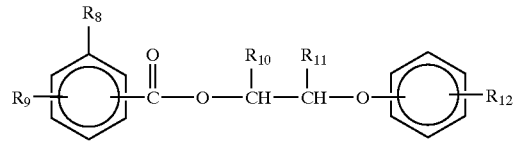

wherein:
R$_8$ is —(CH$_2$)$_n$—NR$_{13}$R$_{14}$, wherein R$_{13}$ and R$_{14}$ are independently hydrogen or lower alkyl having 1 to 6 carbon atoms and n is 0 or 1;
R$_9$ is hydrogen, hydroxy, nitro or —NR$_{15}$R$_{16}$, wherein R$_{15}$ and R$_{16}$ are independently hydrogen or lower alkyl having 1 to 6 carbon atoms;
R$_{10}$ and R$_{11}$ are independently hydrogen or lower alkyl having 1 to 6 carbon atoms; and
R$_{12}$ is a polyalkyl group having an average molecular weight in the range of about 450 to 5,000.

16. The method of claim 2 wherein the nitrogen-containing detergent additive includes at least one polyalkylphenoxyaminoalkane.

17. The method of claim 16 wherein the polyalkylphenoxyaminoalkane is characterized by the formula:

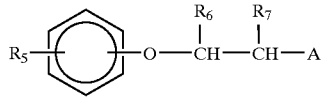

wherein:
R$_5$ is a polyalkyl group having an average molecular weight in the range of about 600 to 5,000;
R$_6$ and R$_7$ are independently hydrogen or lower alkyl having 1 to 6 carbon atoms; and
A is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms.

18. The method of claim 2 wherein the nitrogen-containing detergent additive comprises a mixture of an amino aromatic ester of a polyalkylphenoxyalkanol and a hydrocarbyl poly(oxyalkylene) amine.

19. The method of claim 1 wherein the nitrogen-containing detergent additive is present in the liquid hydrocarbon in a concentration within the range of from about 25 ppm to about 2500 ppm.

20. The method of claim 19 wherein the nitrogen-containing detergent additive is present in the liquid hydrocarbon in a concentration within the range of from about 35 ppm to about 1000 ppm.

21. The method of claim 1 wherein a fuel-soluble, non-volatile carrier is also present in the liquid hydrocarbon.

22. The method of claim 21 wherein the fuel-soluble, non-volatile carrier is present in the liquid hydrocarbon in a concentration within the range of from about 25 ppm to about 2500 ppm.

23. The method of claim 22 wherein the fuel-soluble, non-volatile carrier is present in the liquid hydrocarbon in a concentration within the range of from about 35 ppm to about 1000 ppm.

24. The method of claim 1 wherein the liquid hydrocarbon primarily comprises a distillate fuel.

25. The method of claim 24 wherein the distillate fuel comprises a low sulfur gasoline blend stock.

26. The method of claim 25 wherein the low sulfur gasolines blend stock is hydrotreated straight run gasoline.

27. The method of claim 25 wherein the low sulfur gasolines blend stock is hydrotreated FCC gasoline.

28. The method of claim 25 wherein the low sulfur gasoline blend stock is rerun alkylate.

29. The method of claim 25 wherein the low sulfur gasolines blend stock is reformate.

30. The method of claim 24 wherein the distillate contains less than 3 ppm of sulfur.

31. The method of claim 30 wherein the distillate contains less than 1 ppm of sulfur.

32. The method of claim 31 wherein the distillate contains less than 0.5 ppm of sulfur.

33. The method of claim 1 wherein the fuel cell is a PEM fuel cell.

34. A fuel composition suitable for use in a fuel cell which comprises a liquid hydrocarbon having a boiling range at atmospheric pressure falling between about 77 degrees F. and about 437 degrees F., a total sulfur content of less than 3 ppm, an octane rating of less than 85 (R+M)/2, and containing an effective deposit controlling amount of a nitrogen-containing detergent additive.

35. The fuel composition of claim 34 wherein the total sulfur present is less than 1 ppm.

36. The fuel composition of claim 35 wherein the total sulfur present is less than 0.5 ppm.

37. The fuel composition of claim 34 wherein the liquid hydrocarbon comprises hydrotreated straight run gasoline.

38. The fuel composition of claim 34 wherein the liquid hydrocarbon comprises rerun alkylate.

39. The fuel composition of claim 34 wherein the liquid hydrocarbon comprises reformate.

40. The fuel composition of claim 34 wherein the liquid hydrocarbon comprises hydrotreated FCC gasoline.

41. The fuel composition of claim 34 wherein the nitrogen-containing detergent additive is selected from the group consisting of aliphatic hydrocarbyl amines, hydrocarbyl poly(oxyalkylene) amines, hydrocarbyl-substituted succinimides, Mannich reaction products, nitro and amino aromatic esters of polyalkylphenoxyalkanols, polyalkylphenoxyaminoalkanes, and mixtures thereof.

42. The fuel composition of claim 41 wherein the nitrogen-containing detergent additive includes at least one aliphatic hydrocarbyl amine.

43. The fuel composition of claim 42 wherein the aliphatic hydrocarbyl amine is selected from the group consisting of polyisobutenyl and polyisobutyl monoamine and polyamine.

44. The method of claim 41 wherein the nitrogen-containing detergent additive includes at least one hydrocarbyl poly(oxyalkylene) amine.

45. The fuel composition of claim 44 wherein the hydrocarbyl poly(oxyalkylene) amine is selected from the group consisting of hydrocarbyl poly(oxyalkylene) monoamines and polyamines wherein the hydrocarbyl group contains from 1 to about 30 carbon atoms, the number of oxyalkylene units will range from about 5 to 100, and the amine moiety is derived from ammonia, a primary alkyl or secondary dialkyl monoamine, or a polyamine having a terminal amino nitrogen atom.

46. The fuel composition of claim 45 wherein the hydrocarbyl poly(oxyalkene) amine is a alkylphenyl poly(oxyalkylene) monoamine, wherein the poly(oxyalkylene) moiety contains oxypropylene or oxybutylene units or a mixture of oxypropylene and oxybutylene units.

47. The fuel composition of claim 44 wherein the hydrocarbyl poly(oxyalkylene) amine is a hydrocarbyl poly(oxyalkylene) aminocarbamate.

48. The fuel composition of claim 44 wherein the hydrocarbyl-substituted poly(oxyalkylene) amine is characterized by the formula:

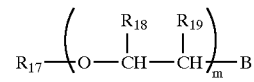

wherein:

$R_{17}$ is a hydrocarbyl group having from about 1 to about 30 carbon atoms;

$R_{18}$ and $R_{19}$ are each independently hydrogen or lower alkyl having about 1 to about 6 carbon atoms and each $R_{18}$ and $R_{19}$ is independently selected in each —O—$CHR_{18}$—$CHR_{19}$— unit;

B is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and m is an integer from about 5 to about 100.

49. The fuel composition of claim 41 wherein the nitrogen-containing detergent additive includes at least one hydrocarbyl-substituted succinimide.

50. The fuel composition of claim 49 wherein the hydrocarbyl-substituted succinimide is a polyalkyl or polyalkenyl succinimide wherein the polyalkyl and polyalkenyl moiety has an average molecular weight of from about 500 to about 5,000.

51. The fuel composition of claim 41 wherein the nitrogen-containing detergent additive includes at least one Mannich reaction product.

52. The fuel composition of claim 50 wherein the Mannich reaction product is obtained by condensing a polyalkylphenol with an aliphatic aldehyde and an alkylene polyamine.

53. The fuel composition of claim 41 wherein the nitrogen-containing detergent additive includes at least one amino aromatic ester of a polyalkylphenoxyalkanol.

54. The fuel composition of claim 53 wherein the amino aromatic ester of a polyalkylphenoxyalkanol is characterized by the formula:

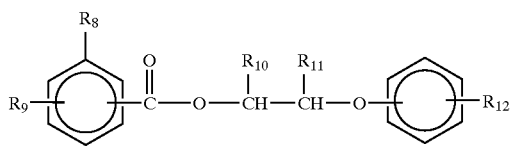

wherein:
- $R_8$ is $—(CH_2)_n—NR_{13}R_{14}$, wherein $R_{13}$ and $R_{14}$ are independently hydrogen or lower alkyl having 1 to 6 carbon atoms and n is 0 or 1;
- $R_9$ is hydrogen, hydroxy, nitro or $—NR_{15}R_{16}$, wherein $R_{15}$ and $R_{16}$ are independently hydrogen or lower alkyl having 1 to 6 carbon atoms;
- $R_{10}$ and $R_{11}$ are independently hydrogen or lower alkyl having 1 to 6 carbon atoms; and
- $R_{12}$ is a polyalkyl group having an average molecular weight in the range of about 450 to 5,000.

55. The fuel composition of claim 41 wherein the nitrogen-containing detergent additive includes at least one polyalkylphenoxyaminoalkane.

56. The fuel composition of claim 55 wherein the polyalkylphenoxyaminoalkane is characterized by the formula:

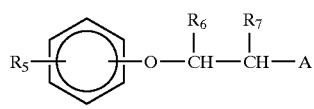

wherein:
- $R_5$ is a polyalkyl group having an average molecular weight in the range of about 600 to 5,000;
- $R_6$ and $R_7$ are independently hydrogen or lower alkyl having 1 to 6 carbon atoms; and
- A is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms.

57. The fuel composition of claim 41 wherein the nitrogen-containing detergent additive comprises a mixture of an amino aromatic ester of a polyalkylphenoxyalkanol and a hydrocarbyl poly(oxyalkylene) amine.

58. The fuel composition of claim 34 wherein the nitrogen-containing detergent additive is present in the liquid hydrocarbon in a concentration within the range of from about 25 ppm to about 2500 ppm.

59. The fuel composition of claim 58 wherein the nitrogen-containing detergent additive is present in the liquid hydrocarbon in a concentration within the range of from about 35 ppm to about 1000 ppm.

60. The fuel composition of claim 34 wherein a fuel-soluble, non-volatile carrier is also present.

61. The fuel composition of claim 60 wherein the fuel-soluble, non-volatile carrier is present in the liquid hydrocarbon in a concentration within the range of from about 25 ppm to about 2500 ppm.

62. The fuel composition of claim 61 wherein the fuel-soluble, non-volatile carrier is present in the liquid hydrocarbon in a concentration within the range of from about 35 ppm to about 1000 ppm.

* * * * *